United States Patent
Bueno Buoro et al.

(10) Patent No.: US 11,300,708 B2
(45) Date of Patent: Apr. 12, 2022

(54) TUNING WEATHER FORECASTS THROUGH HYPER-LOCALIZATION

(71) Applicant: International Business Machines Corporation, Armonk, NY (US)

(72) Inventors: Alvaro Bueno Buoro, Rio de Janeiro (BR); Vagner Figueredo de Santana, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 16/806,394

(22) Filed: Mar. 2, 2020

(65) Prior Publication Data

US 2021/0270999 A1    Sep. 2, 2021

(51) Int. Cl.
| | | |
|---|---|---|
| *G01W 1/10* | (2006.01) | |
| *G06N 3/08* | (2006.01) | |
| *G01W 1/00* | (2006.01) | |
| *G06N 20/00* | (2019.01) | |
| *G01W 1/02* | (2006.01) | |
| *G06T 7/00* | (2017.01) | |

(52) U.S. Cl.
CPC .............. *G01W 1/10* (2013.01); *G06N 3/08* (2013.01); *G01W 1/02* (2013.01); *G01W 2001/006* (2013.01); *G01W 2201/00* (2013.01); *G01W 2203/00* (2013.01); *G06N 20/00* (2019.01); *G06T 7/00* (2013.01)

(58) Field of Classification Search
CPC ............. G01W 1/10; G01W 2001/006; G01W 2203/00; G01W 1/02; G01W 2201/00; G06N 3/08; G06N 20/00; G06T 7/00
See application file for complete search history.

(56) References Cited

U.S. PATENT DOCUMENTS

| | | |
|---|---|---|
| 7,840,342 B1 | 11/2010 | Breed |
| 7,982,658 B2 | 7/2011 | Kauffman et al. |
| 8,060,308 B2 | 11/2011 | Breed |
| 8,902,081 B2 | 12/2014 | Groeneweg |
| 9,105,189 B2 | 8/2015 | Rubin et al. |
| 9,140,824 B1 | 9/2015 | Mewes et al. |
| 9,310,518 B2 | 4/2016 | Haas et al. |
| 9,465,987 B1 | 10/2016 | Bell et al. |
| 10,162,355 B2 | 12/2018 | Hayon et al. |
| 10,168,448 B2 * | 1/2019 | Hamann ................. G01W 1/10 |
| 10,204,193 B2 | 2/2019 | Koger et al. |

(Continued)

*Primary Examiner* — Daniel R Miller
*Assistant Examiner* — Christian T Bryant
(74) *Attorney, Agent, or Firm* — Patterson + Sheridan, LLP

(57) ABSTRACT

The embodiments herein describe a forecasting system that uses captured images or a location to generate a weather forecast for that location. As used herein, a hyper-location is any location where images of that location are available to the forecasting system. For example, a hyper-location can be an airport where a security camera can provide historical images of the weather conditions at the airport. In one embodiment, the forecasting system can extract attributes from the images that indicate the historical weather conditions at the hyper-location. The forecasting system can then use those weather conditions to select which one of a plurality of historical scenarios best matches the weather conditions. The selected scenario can then be used to train a machine learning (ML) model that tunes a weather forecast for that location.

20 Claims, 5 Drawing Sheets

(56) References Cited

U.S. PATENT DOCUMENTS

| | | |
|---|---|---|
| 10,217,169 B2 | 2/2019 | Schumann, Jr. et al. |
| 2017/0131435 A1 | 5/2017 | Peacock et al. |
| 2017/0169532 A1* | 6/2017 | Appel ............... G06F 16/24578 |
| 2017/0286838 A1* | 10/2017 | Cipriani ................. G06N 20/00 |
| 2018/0038994 A1* | 2/2018 | Hamann ................. G01W 1/10 |
| 2018/0372914 A1* | 12/2018 | Yan ......................... G06F 30/20 |

\* cited by examiner

TUNING WEATHER FORECASTS THROUGH HYPER-LOCALIZATION

BACKGROUND

The present invention relates to generating weather forecasts, and more specifically, to using images captured at the location to improve the accuracy of the weather forecasts.

Currently, weather forecasts are generated using physical models. These models are typically generated based on a grid system, where each grid can have a unique forecast. However, these grids can be very large (e.g., several square miles or kilometers). As a result, the weather forecasts cannot account for micro-climates or provide precise forecasts at a specific location—e.g., a particular road, parking lot, building, public transportation station, and the like. That is, the weather forecast for a grid may not apply to all the locations within that grid. For example, the temperature may be different at different locations in the grid, or some location may be more prone to certain weather conditions such as flooding or fog than other locations in the grid.

SUMMARY

One embodiment of the present invention is a method that includes identifying a weather condition of interest at a location, generating a plurality of historical scenarios at the location for a period of time, retrieving images captured at the location during the period of time, extracting attributes from the images to identify a current condition at the location, wherein the attributes are related to the weather condition at the location, identifying one of the plurality of historical scenarios that matches the current condition at the location, training a machine learning (ML) model based on the identified historical scenario, and generating a weather forecast for the location using the ML model.

Another embodiment of the present invention includes a system that includes a processor and memory. The memory including a program, which when executed by the processor performs an operation. The operation includes identifying a weather condition of interest at a location, generating a plurality of historical scenarios at the location for a period of time, retrieving images captured at the location during the period of time, extracting attributes from the images to identify a current condition at the location, wherein the attributes are related to the weather condition at the location, identifying one of the plurality of historical scenarios that matches the current condition at the location, training a machine learning (ML) model based on the identified historical scenario, and generating a weather forecast for the location using the ML model.

Another embodiment of the present invention includes A computer program product for generating a weather forecast that includes a computer readable storage medium having computer readable program code embodied therewith, the computer readable program code executable by one or more computer processors to perform an operation. The operation includes identifying a weather condition of interest at a location, generating a plurality of historical scenarios at the location for a period of time, retrieving images captured at the location during the period of time, extracting attributes from the images to identify a current condition at the location, wherein the attributes are related to the weather condition at the location, identifying one of the plurality of historical scenarios that matches the current condition at the location, training a machine learning (ML) model based on the identified historical scenario, and generating a weather forecast for the location using the ML model.

DETAILED DESCRIPTION

The embodiments herein describe a forecasting system that uses captured images of a location to generate a weather forecast for that location. As used herein, a hyper-location is any location where images of that location are available to the forecasting system. For example, a hyper-location can be an airport where a security camera can provide historical images of the weather conditions at the airport, a road where an Internet of Things (IoT) device captures images of the road, or an amusement park where users have tagged images of the park in a social media application. In one embodiment, the forecasting system can extract attributes from the images that indicate the historical weather conditions at the hyper-location. The forecasting system can then use those weather conditions to select which one of a plurality of historical scenarios (which are derived based on a physical model) best matches the weather conditions. The selected scenario can then be used to train a machine learning (ML) model that tunes a weather forecast for that location. Put differently, the forecasting system can use the images to train a ML model that enables to system to provide a more accurate weather forecast for a hyper-location relative to relying solely on a physical model to generate the forecast.

Figure 1:
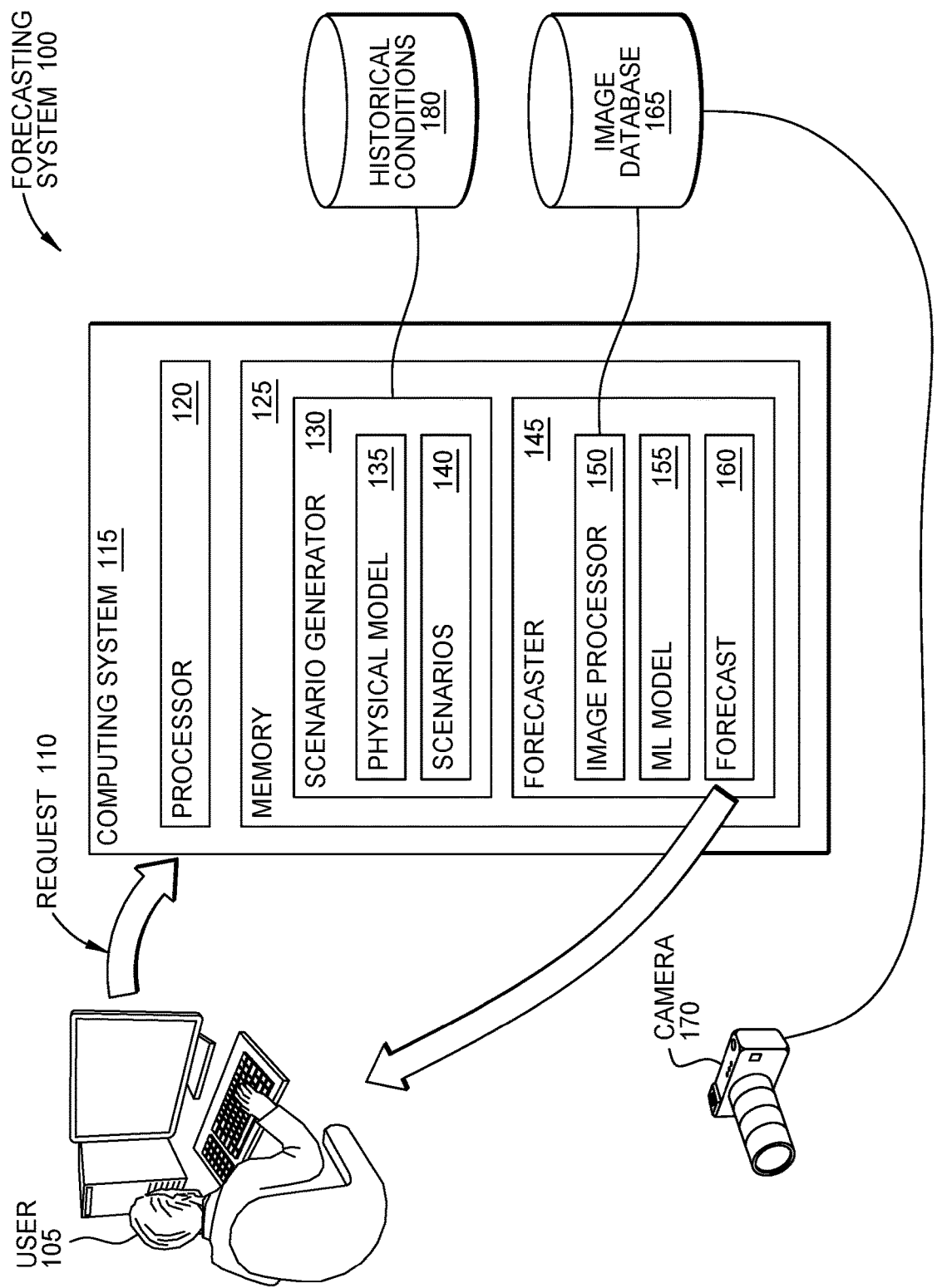
FIG. 1 illustrates a forecasting system that uses captured images to generate weather forecasts for a particular location, according to one embodiment described herein.

FIG. 1 illustrates a forecasting system 100 that uses captured images to generate weather forecasts 160 for a particular location, according to one embodiment described herein. The forecasting system 100 is communicatively coupled to a computing device used by a user 105 to submit a request for a weather forecast. In one embodiment, the request indicates a hyper-location—i.e., a geographic location where its weather conditions are captured by a plurality of images. In response to the request 110, the computing system 115 generates a forecast 160 which is then provided to the user computing device. For example, the user 105 may submit a request 110 to a weather forecasting website for a forecast, or the user may have a weather application (App) executing on her mobile device which submits the request 110 to the computing system 115. In those examples, the computing system 115 may be a web server or a computing system in a data center (e.g., a cloud computing center) which generates a forecast 160 corresponding to the request 110.

The computing system 115 includes a processor 120 which represents one or more processing elements which each can include one or more processing cores. The system 115 also includes a memory 125 which can be non-volatile memory elements, volatile memory elements, and combinations thereof. As shown, the memory 125 stores a scenario generator 130 and a forecaster 145. These components may be software applications or software modules executing on the computing system 115.

The scenario generator 130 includes a physical model 135 that is used to generate different scenarios 140 for a location. That is, the scenario generator 130 uses the physical model 135 corresponding to the location along with historical conditions 180 at that location to generate the scenarios 140. However, these scenarios 140 may not be accurate for a specific location (e.g., a parking lot, street, airport, etc.) but instead may be intended for a large region (e.g., a grid that is several square miles or kilometers in size). Thus, if the forecast 160 is generated based solely on the scenarios 140, the forecast may be inaccurate for different locations within the region. For example, the forecast may predict that the temperature in a region is below freezing, and thus, the roads are snow covered. However, one (or several) roads in the region may get a lot of sunlight, traffic, or frequent visits from a salt truck that means despite the freezing temperatures, the snow is removed faster from these roads than other locations in the region. In another example, a road in the region may have a temperature that is either several degrees warmer or colder than the average or measured temperature for the region (as stored in the historical conditions 180). Thus, a general weather forecast for the region may often be a poor forecast for that road.

To provide a more accurate forecast 160, the forecaster 145 includes an image processor 150 which identifies historical accurate conditions for a hyper-location. To do so, the image processor 150 retrieves images from an image database 165 which stores images captured by a camera 170 at the hyper-location. The camera 170 can be an IoT device, security camera, traffic camera, or personal user device. The images captured by the camera 170 can be publically accessible or the image database 165 may be secure. In one embodiment, users may post images of the hyper-location to social media which are then mined and stored in the image database 165.

The image processor 150 can use an image processing technique to extract weather conditions at the locations— i.e., a snow accumulation, flooding, precipitation (rain or snow), fog, wind gusts, and the like. As explained in more detail later, these weather conditions can be used to select one of the scenarios 140. That is, the forecaster 145 can select the scenario 140 for the location that best matches the conditions identified using the images captured by the camera 170. The forecaster 145 can use the selected scenario to train a ML model 155—e.g., a Long Short-Term Memory (LSTM) model or any other ML model compatible with time series data. The forecaster 145 can then use the ML model 155 to tune the forecast 160 for the hyper-location as discussed in detail below. In this manner, the forecaster 145 can use the images to generate a more accurate forecast 160.

Figure 2:
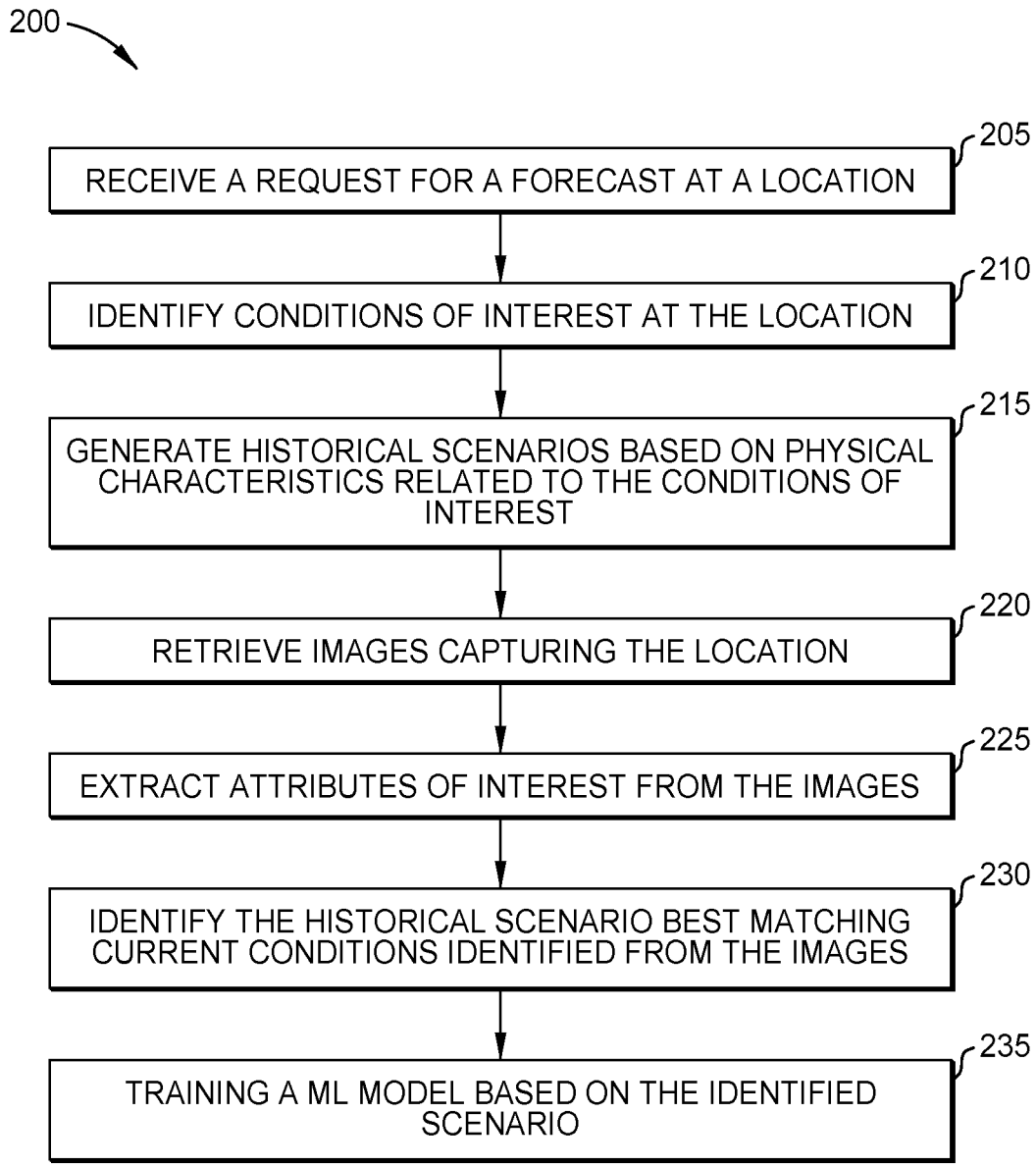
FIG. 2 is a flowchart for training a machine learning model using captured images, according to one embodiment described herein.

FIG. 2 is a flowchart of a method 200 for training a ML model using captured images, according to one embodiment described herein. At block 205, a forecasting system receives a request for a forecast at a location (e.g., a hyper-location). That is, a user may submit a request via a website or a weather application (App) for a future forecast of a selected location. For example, a weather website or App may indicate in a graphical user interface (GUI) that there are hyper-locations where the user can receive a specialized forecast for that location. These locations may be any location where historical images of that location are accessible to the forecasting system. The user can select one the hyper-locations which prompts the forecasting system to generate the forecast.

At block 210, the forecasting system identifies conditions of interest at the location. For example, the user may indicate what types of weather conditions she is interested in—e.g., snow, temperature, wind gusts, flooding, etc. The forecasting system can then generate a forecast specific for the conditions of interest of the user. Of course, in other embodiments, the forecasting system may provide a general forecast for the location, which may include all conditions it monitors.

At block 215, the scenario generator in the forecasting system generates historical scenarios based on physical characteristics related to the conditions of interest. That is, if the user is interested in whether a road is flooded or covered in snow or fog, the physical characteristics may include rain fall, snow fall, temperature, humidity, etc. which may be physical characteristics that affect the conditions the user is interested in. These physical conditions can be retrieved from the historical conditions database. For example, the physical conditions may include measurements generated by weather monitoring sensors near the location (e.g., rain gauge, Doppler radar measurements, anemometer, psychrometer, etc.). The historical conditions can also be measured (or derived) using weather simulations and a physical model.

In one embodiment, the scenario generator generates several historical scenarios for the location for a period of time (e.g., two hours before receiving the user request). That is, the scenario generator may use the historical conditions to estimate the weather conditions at the location previous to when the user submitted the request. Given the uncertainty, the scenario generator may use different physical models (or different weights for the same model) which results in several historical scenarios that estimate the weather conditions at the location in the past (i.e., before the user submitted her request for a forecast). In one embodiment, the historical scenarios encompass average situations derived from the historical conditions and one or more physical models.

Figure 3:
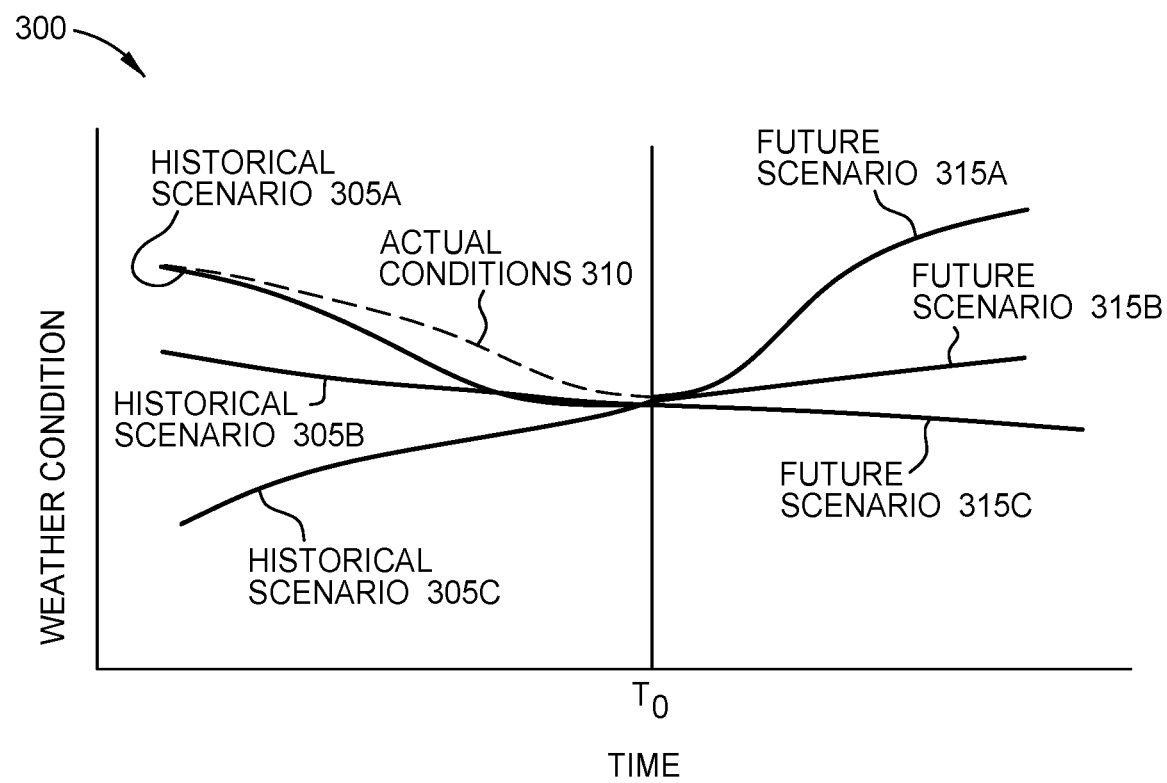
FIG. 3 illustrates various scenarios for generating a weather forecast, according to one embodiment described herein.

FIG. 3 illustrates various scenarios for generating a weather forecast, according to one embodiment described herein. Specifically, FIG. 3 illustrates a chart 300 that includes an X-axis illustrating time and a Y-axis indicating a weather condition (e.g., temperature, snow accumulation, rain fall, humidity, wind speed, etc.). At Time $T_0$, the forecasting system receives the user request at block 205 requesting a forecast for a hyper-location. In response, the forecasting system generates the historical scenarios 305A-C (as discussed at block 215) which predict the value of the weather condition for the time previous to when the user submitted her request, i.e., $T_0$. While the chart 300 illustrates generating only three historical scenarios 305A-C, the scenario generator can generate any number of scenarios. However, the forecasting system may limit the number of historical scenarios 305 generated due to a limit of compute resource and to make sure a forecast can be timely provided to the user.

As will be discussed later, in addition to the historical scenarios 305, the chart 300 also includes actual conditions 310 and future scenarios 315. In general, the actual conditions 310 represent the actual historical conditions at the location while the future scenarios 315 indicate predicted values of the weather condition in the future (e.g., after Time $T_0$). The method 200 can be used to identify the actual conditions 310 (using the images) and help to identify the future scenarios 315 that results in an improved forecast for the hyper-location.

Returning to the method 200, at block 220 the image processor retrieves images capturing the location (e.g., the hyper-location). In one embodiment, the image processor retrieves images from an image database that correspond to the time period prior to receiving the request for the forecast at block 205 and is the same period of time (or at least overlapping period of time) as the historical scenarios. For example, an IoT device at the location may transmit a new image of the location to the image database periodically, or a mining application may search social images for recent images of the location and store those images in the image database. Thus, the image processor has access to recent images showing the weather conditions at the location.

At block 225, the image processor extracts attributes of interest from the images. The image processor can use any image processing technique (e.g., a ML algorithm or extraction algorithm) to identify the attributes of interest which can include rainfall, snowfall, fog, flooding, snow accumulation, temperature, and the like. For example, a ML algorithm may be trained to identify the temperature at the location (e.g., above or below freezing) based on a series of images capturing the location. In that example, each image retrieved at block 220 may have a timestamp so the image processor can determine whether the snow is melting at the location over time (indicating the temperature is above freezing) or not (indicating the temperature is at or below freezing).

In addition to weather conditions, the image processor can determine whether the location has other attributes that can affect the forecast. For example, the snow on a busy street may be cleared because of the frequent traffic, even if the temperature is well below freezing. Moreover, a snowplow or salt truck may make frequent rounds at the location. These non-environment conditions may also be captured by the image processor and can be used to affect the forecast. For example, assume a first location and a second location have the exact same weather conditions (e.g., same temperature and snow accumulation). The image processor may learn that the first location is visited more frequently by a snowplow or salt truck than the second location which causes it to become clearer from snow accumulation faster. As a result, the forecasting system may generate a forecast indicating the first location will be clear from snow much sooner than a forecast for the second location. In this manner, the image processor permits a forecasting system to generate forecasts that are based on weather conditions and non-environmental conditions.

In one embodiment, the attributes of interest extracted from the images are the actual conditions of the location (i.e., the actual condition 310) illustrated in FIG. 3. Stated differently, the image processor can identify the actual value or status of the location (e.g., whether it is raining/snowing, whether there is flooding or accumulation, whether the road has been cleared by a plow or because of traffic, etc.).

At block 230, the forecaster identifies the historical scenario best matching the current conditions identified from the images. Using FIG. 3 as an example, the actual conditions 310 (e.g., the current conditions) at the location have the closest values as the historical scenario 305A. That is, the actual conditions 310 can be used to identify which of the historical scenarios 305 (which were predicted by the scenario generator) best represents the actual conditions at the location. That is, if the weather condition defined by the X-axis of the chart 300 is temperature at the location, the forecaster selects the historical scenario 305 which has temperature values for the period of time before $T_0$ which best matches the temperature values associated with the actual conditions 310 as derived from the images of the location.

At block 235, the forecaster trains a ML model based on the identified scenario. Put differently, the scenario that best matches the actual conditions of the location is used as training data for the ML model which is then used to fine tune the forecast for the location. Thus, instead of the ML model being trained using historical scenario that may, or may not, match the actual reality of the location, the ML model is trained using data that best matches what actually happens at the location, thereby improving the accuracy of the ML model when fine tuning the future forecast at the location.

Figure 4:
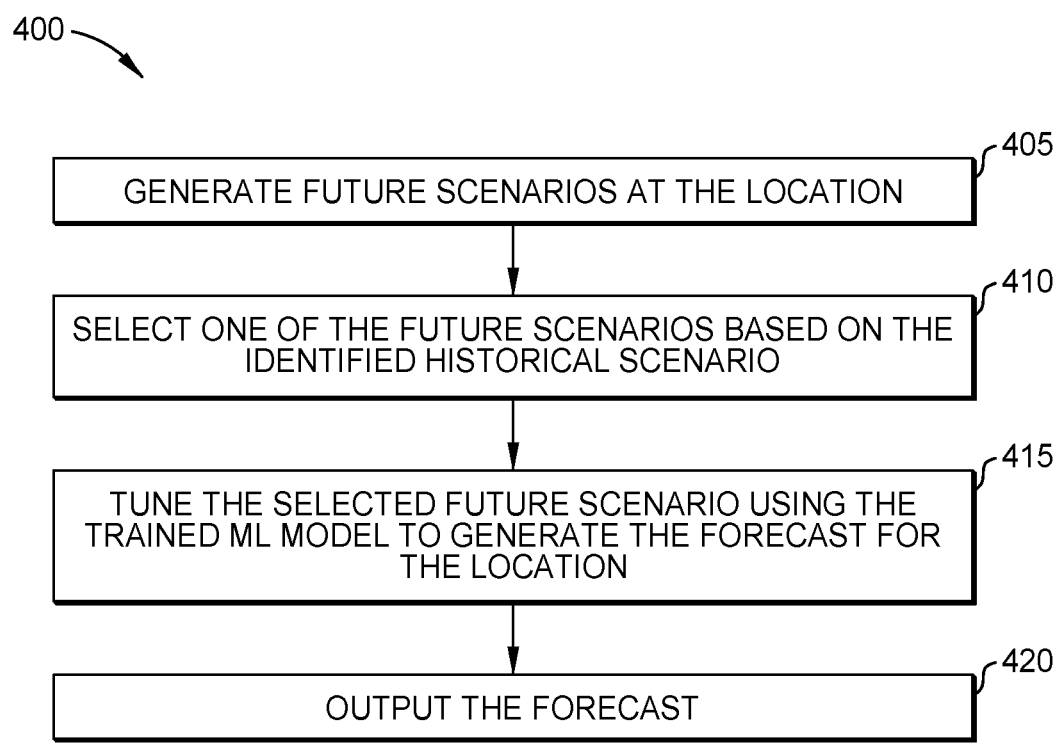
FIG. 4 is a flowchart for generating a weather forecast using a trained machine learning model, according to one embodiment described herein.

FIG. 4 is a flowchart of a method 400 for generating a weather forecast using a trained ML model, according to one embodiment described herein. At block 405, the scenario generator generates future scenarios at a location that was selected by a user. That is, the method 400 may apply to the same location that was discussed in the method 200. In one embodiment, the blocks in the method 400 may occur after the method 200, but this is not a requirement since some of the blocks in the method 400 may occur before or during some of the blocks in the method 200.

Examples of future scenarios 315 are illustrated in FIG. 3. In one embodiment, each future scenario 315 corresponds to one of the historical scenarios 305. For example, based on a particular physical model (or a particular version of a physical model), the scenario generator may generate a historical scenario 305 and a corresponding future scenario 315. For instance, the historical scenario 305A may correspond to the future scenario 315C, the historical scenario 305B may correspond to the future scenario 315B, and the historical scenario 305C may correspond to the future scenario 315A.

At block 410, the forecaster selects one of the future scenarios based on the identified historical scenario. That is, the forecaster selects the future scenario that corresponds to the historical scenario that matched the current conditions at the location as identified at block 230 of the method 200. Again referring to FIG. 3, the historical scenario 305A best matches the actual conditions 310. Thus, at block 410, the forecaster selects the future scenario (e.g., future scenario 315C) that corresponds to the same physical model used to generate the historical scenario 305A. Thus, the selected future scenario may better predict the future conditions at the location than the other future scenarios outputted by the scenario generator.

At block 415, the forecaster tunes the selected future scenario using the trained ML model to generate the forecast for the location. That is, the ML model receives the selected future scenario as an input and tunes (alters) the future scenario in response to being trained by the historical scenario that best matches the actual conditions.

While the methods 200 and 400 discuss training the ML model using one historical scenario, these methods 200 and 400 may execute over many different time periods for the location. Thus, the forecaster may include a respective ML model for each hyper-location, where that ML model is transmitted using many different historical scenarios (which were identified using the images corresponding to the location).

At block 420, the forecaster outputs the forecast for the location. That is, the forecaster outputs a forecast based on the tuned future scenario generated by the ML model. This tuned future scenario is selected in response to the actual conditions at the location. Further, the ML model may have been trained, over a period of time, using multiple different historical scenarios selected based on the current conditions at the location. Thus, not only is the future scenario selected based on the current conditions when the user made her request, but also on a trained ML model that may be continually updated and revised over a period of time as additional image data is received.

In one embodiment, the forecast is output on a GUI that indicates one or more future conditions at the location, as predicted by the forecaster. For example, the forecast may be displayed as part of a weather App or a weather website. The user can select on a location, and in almost real time, receive a forecast for one or more conditions at the location (e.g., flooding, snow coverage, fog, etc.) using the methods 200 and 400.

Figure 5:
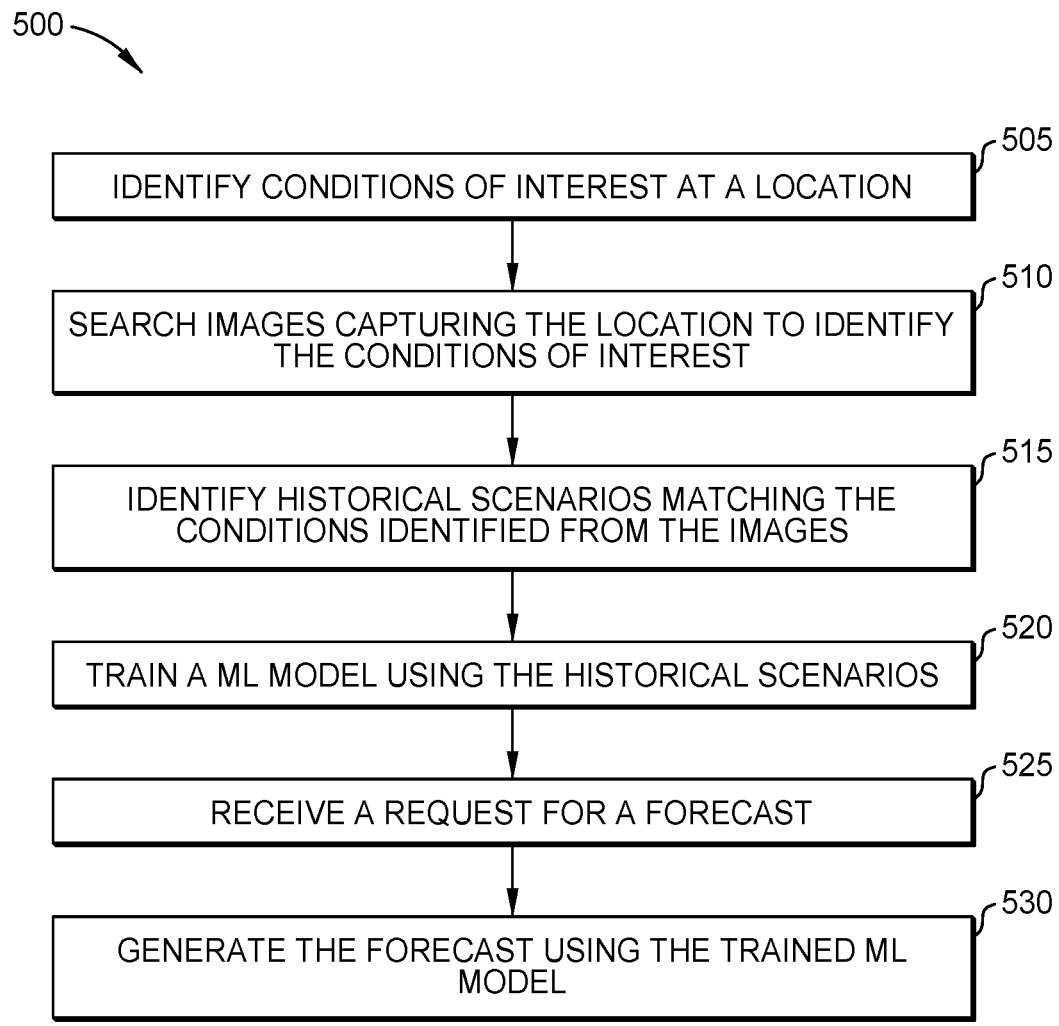
FIG. 5 is a flowchart for generating a forecast using a trained machine learning model, according to one embodiment described herein.

FIG. 5 is a flowchart of a method 500 for generating a forecast using a trained ML model, according to one embodiment described herein. While the method 200 in FIG. 2 started with a request from a user for a forecast, many of the blocks in the method 500 illustrated in FIG. 5 may be performed before a user submits a request for a forecast. Put differently, the method 500 can be performed without waiting for a user to submit a request.

At block 505, the forecaster identifies conditions of interest at a location. In one embodiment, a weather forecast provider indicates to the forecasting system what conditions it should generate a forecast for. For example, for each location where image data is available, the provider may instruct the forecaster to train a ML model for predicting snowfall, rainfall, fog, flooding, snow melting rate, and combinations thereof. Thus, whenever a request is received from the user, the forecaster may be prepared with a trained ML model to provide a forecast for any one of the weather conditions (or a combination of the weather conditions).

At block 510, the image processor searches images capturing the location to identify the conditions of interests. That is, the image process may perform the same techniques used at block 225 of the method 200 to extract attributes of interest from the images. However, these conditions may be ones identified by the provider rather than an end user. These weather conditions may be a large set of conditions so the forecaster is ready to provide a forecast regardless of which subset of the conditions is selected by the user. Also, since a user request is not received, the method 500 may not be facing any kind of time constraint since the user is not waiting for a response. Thus, the forecaster may search the images for a much larger set of conditions relative to block 225 of the method 200 which is performed after the user request is received and based on the particular attributes of interest to the user.

At block 515, the forecaster identifies historical scenarios matching the conditions identified from the images. In one embodiment, block 515 is performed intermittently (e.g., once a day) or when a certain number of images are received for a location. For example, when the forecaster receives images that have timestamps that span an eight hour window, the forecaster may perform block 515 to match the conditions identified from the images to a historical scenario.

In one embodiment, the scenario generator generates a plurality of historical scenarios, as discussed in the method 200 for the time period corresponding to the timestamps of the images. As mentioned in the method 200, the historical scenarios may be generated using different physical models or different parameters or states of the same physical model. As shown in FIG. 3, these historical models can be compared to the actual conditions at the location for the same time window. In this manner, for a plurality of different time windows, the forecaster can identify the historical scenarios that best match the actual conditions at the location as learned from the images.

At block 520, the forecaster trains a ML model using the historical scenario. In one embodiment, the blocks 505-515 may repeat for multiple time periods where the forecaster identifies historical scenarios best matching the images captured during those time periods. These historical scenarios can then be used as training data for the ML model. In this manner, the forecaster can train the ML model, regardless whether a user request has been received. In one embodiment, because the ML model has already been trained, the ML model is immediately available to be used to predict a forecast for the condition (or conditions) of interest to the user, assuming the user specified condition is one of the conditions identified at block 505.

At block 525, the forecasting system receives a request for a forecast for one or more of the conditions of interests identified at block 505 from a user. That is, like at block 205 of the method 200, the forecasting system may receive a request from a weather App or a weather provider website for a forecast at a hyper-location. The user may request a default forecast (e.g., a forecast that covers a default set of weather conditions) or a specialized forecast (e.g., a forecast regarding whether a road will be covered in snow or flood in the next six hours). In either case, the ML model trained using the method 500 can help to generate the forecast.

At block 530, the forecaster generates the forecast using the trained ML model. In one embodiment, the forecaster can use a method similar to the method 400 to generate the forecast. For example, the forecaster can identify the future scenario that best matches the most recent historical scenario identified at block 515. This future scenario can then be used as an input to the trained ML model. Thus, in this embodiment, the forecaster may not have to perform any further training on the ML model after receiving the user request. That is, because the ML model was already training the forecaster can service the user request by providing the desired forecast without first training the ML model using the historical scenario. However, in another example, the forecaster may perform blocks 210-235 to further train the trained ML model in response to receiving a user request. Thus, there is a tradeoff between the delay for (further) training the ML model which may improve the accuracy of the ML model versus using the already trained ML model which may reduce the time required to provide the forecast but may not be as accurate since the ML model may not have been trained using a selected historical scenario that occurred immediately prior to receiving the user request at block 525.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
identifying a weather condition of interest at a location;
generating a plurality of historical scenarios at the location for a period of time;
retrieving images captured at the location during the period of time;
extracting attributes from the images to identify a current condition at the location, wherein the attributes are related to the weather condition at the location;
identifying one of the plurality of historical scenarios that matches the current condition at the location;
training a machine learning (ML) model based on the identified historical scenario; and
generating a weather forecast for the location using the ML model.

2. The method of claim 1, further comprising:
receiving a user request for the weather forecast at the location, wherein the user request indicates the weather condition, wherein the ML model is trained using the identified historical scenario after receiving the user request.

3. The method of claim 2, wherein the plurality of historical scenarios comprises different values of at least one weather condition during the time period, wherein the time period is immediately prior to a time when the user request was received.

4. The method of claim 2, further comprising:
generating a plurality of future scenarios after receiving the user request;
selecting one of the plurality of future scenarios based on the identified historical scenario; and
tuning the selected future scenario using the trained ML model to in order to generate the weather forecast.

5. The method of claim 1, further comprising:
receiving a user request for the weather forecast at the location, wherein the ML model is trained using the identified historical scenario before receiving any user requests for the weather forecast at the location.

6. The method of claim 5, further comprising:
generating a plurality of future scenarios after receiving the user request; and
tuning a selected one of the plurality of future scenarios using the trained ML model in order to generate the weather forecast.

7. The method of claim 1, wherein the images are captured by at least one camera that has a view of weather conditions at the location.

8. A system, comprising:
a processor; and
memory comprising a program, which when executed by the processor performs an operation, the operation comprising:
identifying a weather condition of interest at a location;
generating a plurality of historical scenarios at the location for a period of time;
retrieving images captured at the location during the period of time;
extracting attributes from the images to identify a current condition at the location, wherein the attributes are related to the weather condition at the location;
identifying one of the plurality of historical scenarios that matches the current condition at the location;
training a machine learning (ML) model based on the identified historical scenario; and
generating a weather forecast for the location using the ML model.

9. The system of claim 8, wherein the operation further comprises:
receiving a user request for the weather forecast at the location, wherein the user request indicates the weather condition, wherein the ML model is trained using the identified historical scenario after receiving the user request.

10. The system of claim 9, wherein the plurality of historical scenarios comprises different values of at least one weather condition during the time period, wherein the time period is immediately prior to a time when the user request was received.

11. The system of claim 9, wherein the operation further comprises:
generating a plurality of future scenarios after receiving the user request;
selecting one of the plurality of future scenarios based on the identified historical scenario; and
tuning the selected future scenario using the trained ML model to in order to generate the weather forecast.

12. The system of claim 8, wherein the operation further comprises:
receiving a user request for the weather forecast at the location, wherein the ML model is trained using the identified historical scenario before receiving any user requests for the weather forecast at the location.

13. The system of claim 12, wherein the operation further comprises:
generating a plurality of future scenarios after receiving the user request; and
tuning a selected one of the plurality of future scenarios using the trained ML model in order to generate the weather forecast.

14. The system of claim 8, wherein the images are captured by at least one camera that has a view of weather conditions at the location.

15. A computer program product for generating a weather forecast, the computer program product comprising:
a computer readable storage medium having computer readable program code embodied therewith, the computer readable program code executable by one or more computer processors to perform an operation, the operation comprising:
identifying a weather condition of interest at a location;

generating a plurality of historical scenarios at the location for a period of time;
retrieving images captured at the location during the period of time;
extracting attributes from the images to identify a current condition at the location, wherein the attributes are related to the weather condition at the location;
identifying one of the plurality of historical scenarios that matches the current condition at the location;
training a machine learning (ML) model based on the identified historical scenario; and
generating a weather forecast for the location using the ML model.

16. The computer program product of claim 15, wherein the operation further comprises:
receiving a user request for the weather forecast at the location, wherein the user request indicates the weather condition, wherein the ML model is trained using the identified historical scenario after receiving the user request.

17. The computer program product of claim 16, wherein the plurality of historical scenarios comprises different values of at least one weather condition during the time period, wherein the time period is immediately prior to a time when the user request was received.

18. The computer program product of claim 16, wherein the operation further comprises:
generating a plurality of future scenarios after receiving the user request;
selecting one of the plurality of future scenarios based on the identified historical scenario; and
tuning the selected future scenario using the trained ML model to in order to generate the weather forecast.

19. The computer program product of claim 15, wherein the operation further comprises:
receiving a user request for the weather forecast at the location, wherein the ML model is trained using the identified historical scenario before receiving any user requests for the weather forecast at the location.

20. The computer program product of claim 19, wherein the operation further comprises:
generating a plurality of future scenarios after receiving the user request; and
tuning a selected one of the plurality of future scenarios using the trained ML model in order to generate the weather forecast.

* * * * *